United States Patent
Kariniemi

(10) Patent No.: US 10,137,769 B2
(45) Date of Patent: Nov. 27, 2018

(54) CENTER MOUNTED AIR CHUTE FOR A REAR MOUNTED ENGINE

(71) Applicant: Stephen Kariniemi, Scottsdale, AZ (US)

(72) Inventor: Stephen Kariniemi, Scottsdale, AZ (US)

(73) Assignee: Stephen Kariniemi, Scottsdale, AZ (US)

( * ) Notice: Subject to any disclaimer, the term of this patent is extended or adjusted under 35 U.S.C. 154(b) by 0 days.

(21) Appl. No.: 15/418,760

(22) Filed: Jan. 29, 2017

(65) Prior Publication Data

US 2018/0215250 A1    Aug. 2, 2018

(51) Int. Cl.
| | |
|---|---|
| *B60K 11/06* | (2006.01) |
| *F02M 35/10* | (2006.01) |
| *B60K 11/08* | (2006.01) |
| *F02M 35/16* | (2006.01) |
| *F01P 11/10* | (2006.01) |

(52) U.S. Cl.
CPC .............. *B60K 11/06* (2013.01); *B60K 11/08* (2013.01); *F01P 11/10* (2013.01); *F02M 35/10118* (2013.01); *F02M 35/162* (2013.01)

(58) Field of Classification Search
CPC ........ B60K 11/06; B60K 11/08; B60K 13/06; B60K 2005/003; B60K 2005/006; B62D 21/17
See application file for complete search history.

(56) References Cited

U.S. PATENT DOCUMENTS

| | | | | |
|---|---|---|---|---|
| 4,597,466 | A | | 7/1986 | Yamada |
| 5,042,870 | A | * | 8/1991 | Yura ...................... B60K 11/08 180/903 |
| 5,086,858 | A | * | 2/1992 | Mizuta .................. B60K 11/06 123/41.56 |
| 8,544,582 | B2 | * | 10/2013 | Kaku ..................... B60K 11/06 180/309 |
| 8,567,847 | B1 | * | 10/2013 | King ...................... B60K 13/02 180/68.3 |
| 9,493,191 | B2 | * | 11/2016 | Kariniemi ............ B62D 21/183 |
| 9,725,023 | B2 | * | 8/2017 | Miller ....................... B60P 1/04 |
| 2004/0195019 | A1 | * | 10/2004 | Kato ....................... B60K 13/02 180/68.3 |
| 2004/0231900 | A1 | * | 11/2004 | Tanaka ................... B60K 13/02 180/68.3 |
| 2006/0238001 | A1 | * | 10/2006 | Konermann ........... B62D 21/17 296/205 |

(Continued)

FOREIGN PATENT DOCUMENTS

| | | | | |
|---|---|---|---|---|
| DE | 690318 | C | * 4/1940 | ............. B60K 11/02 |
| DE | 715402 | C | * 12/1941 | ............. B60K 11/00 |

(Continued)

*Primary Examiner* — Katy M Ebner
(74) *Attorney, Agent, or Firm* — Ryan Kariniemi

(57) ABSTRACT

A vehicle, for example an All-Terrain Vehicle, having a front facing air intake. The air intake is substantially centered along a longitudinal center line and funnels air through an air duct that is positioned from the air intake to a rear mounted engine. The air duct may be located below a passenger seating arrangement and the air duct may extend along a substantial portion of a length. In one embodiment, the air chute is centered along the vehicle.

9 Claims, 4 Drawing Sheets

(56) References Cited

U.S. PATENT DOCUMENTS

| | | | |
|---|---|---|---|
| 2008/0000615 A1* | 1/2008 | Hiroshima | B60K 11/04 165/41 |
| 2011/0094818 A1* | 4/2011 | Suzuki | B60K 5/02 180/292 |
| 2011/0220429 A1 | 9/2011 | Yamamura | |
| 2014/0083790 A1* | 3/2014 | Shomura | F02M 35/162 180/291 |
| 2016/0186705 A1* | 6/2016 | Tsumiyama | F02M 35/162 180/68.3 |
| 2016/0332676 A1* | 11/2016 | Miller | B60P 1/04 |
| 2017/0008386 A1* | 1/2017 | Uranaka | B60K 11/04 |

FOREIGN PATENT DOCUMENTS

| | | | | |
|---|---|---|---|---|
| DE | 1033045 B * | 6/1958 | | B60K 11/00 |
| DE | 102004011909 A1 * | 8/2005 | | B60K 11/08 |
| DE | 102009038834 A1 * | 3/2011 | | B60K 1/00 |
| DE | 102014118631 A1 * | 6/2016 | | B60K 11/08 |
| FR | 1081870 A * | 12/1954 | | B60K 11/02 |
| FR | 2616403 A * | 12/1988 | | B60K 13/06 |
| GB | 440298 A * | 12/1935 | | F01P 11/10 |

* cited by examiner

CENTER MOUNTED AIR CHUTE FOR A REAR MOUNTED ENGINE

FIELD OF THE INVENTION

The present invention generally relates to vehicles, and more specifically to All-Terrain Vehicles.

BACKGROUND OF THE INVENTION

All-terrain vehicles (hereinafter "ATV") typically have rear mounted engines. A rear mounted engine inherently has some disadvantages. One of those disadvantages is that the rear mounted engine is behind a passenger section or cargo section and therefore does not have direct flow of air to the rear mounted engine. This can cause overheating problems or can cause the engine to run warmer or d107ifferent than desired. It remains desirable to have a rear mounted engine that has direct airflow funneled to the engine.

SUMMARY OF THE INVENTION

It has been recognized that it can be beneficial to have a rearward mounted engine with direct air flow to the engine. The rearward mounted engine may have an air chute with a front inlet, a rear outlet and a center portion. The center portion may be along a longitudinal center line of the vehicle. The center portion of the air chute may have an arcuate shape and in some examples have multiple arcuate shapes to create a three dimensional funnel shaped air chute. The air chute may provide a "venturi effect". Additionally the vehicle may have an arcuate frame with a longitudinal arcuate portion and/or a lateral arcuate portion. The vehicle may enable attachment of peripheral structural structures such as an engine cage, a passenger cage, trailing arms, A-arms and other peripheral structures that are known in the art.

In various embodiments, a vehicle can be constructed. For example, a vehicle may be constructed similar to U.S. Pat. No. 9,493,191, An Arcuate Frame For A Vehicle, Kariniemi as inventor. The vehicle may comprise an air chute. The air chute may have a front air inlet, a rear air outlet, and a center portion. The center portion may be connected to the front air inlet with a flared or arcuate portion and/or the center portion may be connected to the rear air outlet with a flared or arcuate portion. The air chute center portion may be positioned along a longitudinal center line of the vehicle. The air inlet and outlet may have a cross sectional area greater than the center portion cross sectional area. The air chute can be attached to the vehicle. The air chute may be attached to a passenger or cargo supporting section. The air inlet may be substantially perpendicular to the ground or passenger support section or the inlet may be positioned to maximize incoming air as the vehicle is moving. For example, with a forward moving vehicle the inlet may be facing forward and substantially perpendicular to the ground.

Additional features and advantages of the invention will be apparent from the description which follows, taken in conjunction with accompanying drawings, which together illustrate, by way of example, features of the invention.

DETAILED DESCRIPTION

Figure 1:
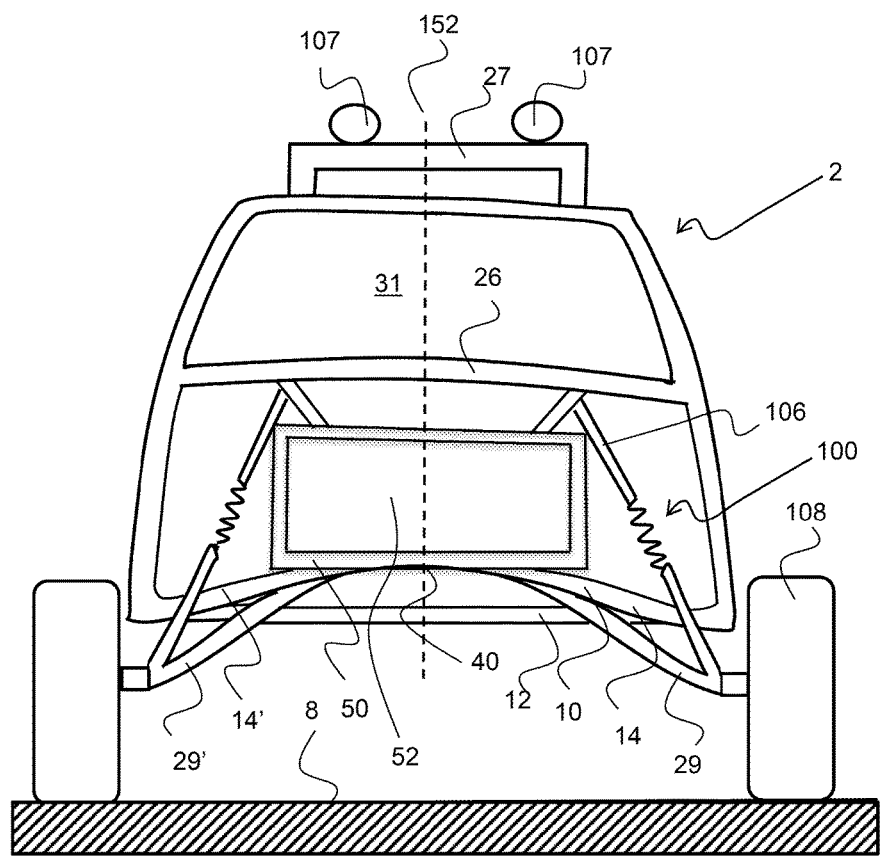
FIG. 1 is a partial front view of an ATV having a lateral arcuate structural frame, a passenger cage, attached A arms and wheels, attached shocks, lights and a front facing air inlet (e.g., radiator grill) for a central air chute in accordance with an embodiment.

Reference will now be made to some embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

In various embodiments, as shown in FIG. 1, An All-Terrain Vehicle (ATV) 2 may have a front facing air inlet 50. The front facing air inlet 50 may be positioned to be perpendicular to a riding surface 8 and the front facing air inlet 50 may be positioned along a longitudinal plane 152. In some embodiments, as shown in FIG. 1, the front facing air inlet is centered along longitudinal plane 152. Also, the ATV 2 may have a lateral arcuate shape 10. The lateral arcuate shape 10 may have an apex 40. The front facing air inlet 50 may be positioned directly above an apex 40 of the lateral arcuate shape 10. In other embodiments, a passenger or cargo carrying compartment 100 may not have a lateral arcuate shape portion and the front facing air inlet 50 may be positioned above a bottom truss 14 and/or 14' (e.g., the bottom truss 14 and/or 14' is flat or parallel to ground surface 8) of the passenger compartment 100.

The ATV 2 with a center mounted air chute 52 may include a passenger compartment 100 or in other embodiments, a cargo carrying compartment. Also, the ATV 2 may have other peripheral attachments. For example, as shown in FIG. 1, shocks 106, lights 107, wheels 108, A Arms 29 and 29', a front window 31, and a roll bar 27. Alternatively, a front ferring may accompany the front facing air inlet 50 or radiator grill 50. The front window 31 may be formed integral with the passenger or cargo carrying compartment 100 by utilizing a lateral cross member 26 that extends from the passenger side of the compartment to the driver's side of the compartment.

In some embodiments, as shown in FIG. 1, cargo carrying compartment 100 may have a lateral arcuate shape portion 10 along its bottom surface at a front portion of the cargo carrying portion 100 and it may have a flat or flattened portion as shown by cross member 12 at rear portion of the cargo carrying portion 100. The cross member 12 may also have a lateral arcuate shape as cross member 14 is shown to have in FIG. 1.

Figure 2:
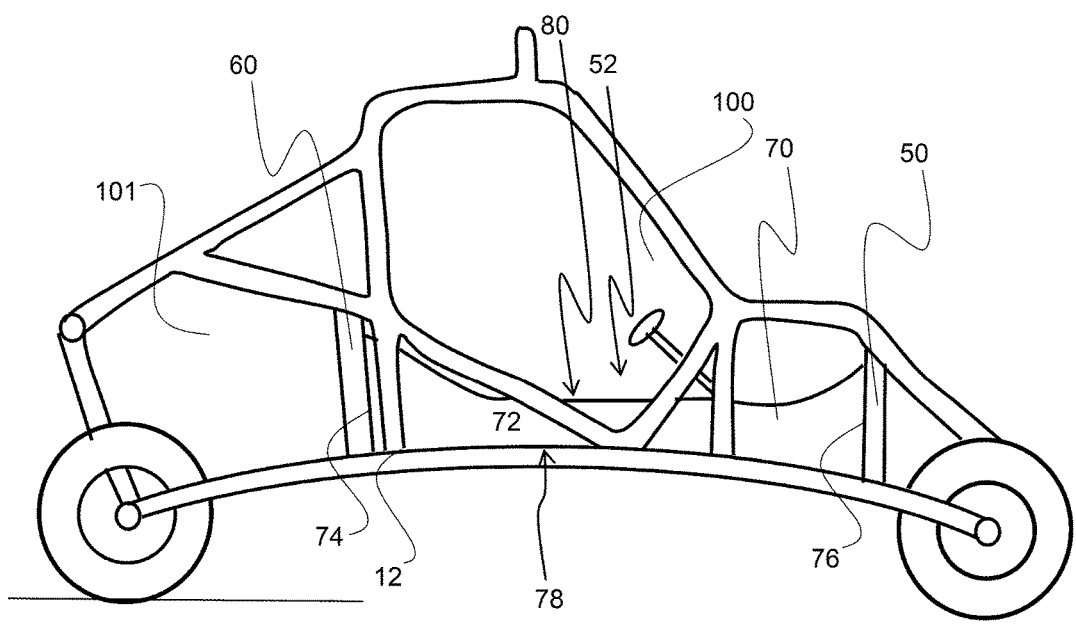
FIG. 2 is a side view of an ATV with an arcuate structural frame having an air chute along a passenger or cargo supporting section of a vehicle.

In various embodiments, as shown in FIG. 2, a center air chute may have a front inlet (e.g., a radiator grill) 50, a rear outlet 60 and a center portion 70. The center portion may also be flared into rear outlet 60 and/or front outlet 50. The front inlet 50 may be of any size desired for a desired air flow. In one example, the front inlet was designed to be 2 feet 7 inches wide and 1 foot 6 inches high. The center portion 70 may be of any size desired. In one embodiment, the center portion 70 is 12 inches wide and approximately 1 foot 6 inches high. In other embodiments, the center portion 70 may have a funnel shape or flares on ends. For example, the center portion 70 may have a height that varies from 1 foot 4 inches at a midpoint of the center portion 70 and 2 feet 3 inches at center portion ends (center portion ends is where center portion meets front inlet 50 and rear outlet 60). In one example, the rear outlet 60 has a dimension of 2 feet 10 inches wide and a height of 2 feet 10 inches. The center portion can be narrower towards middle of the center portion than ends of the center portion. From a side view, the center air chute can be symmetric. In other cases, it may not be symmetric. In some cases, as is shown in FIG. 2, the center air chute may have an arc shape extending downward from the front inlet 50 and then a flattened portion at or near middle of the center portion 70. Additionally, another arc shape may extend up towards the rear outlet 60 from or near the middle of the center portion 70. A bottom surface 78 may be incorporated along cargo carrying portion frame (as shown in FIG. 2). In other cases, the bottom surface may be a mirror image of the top surface 80. In either case, the middle portion of the center air chute 52 may be narrower than its end portions (50,60). In some cases each longitudinal side surface 72 of the center air chute middle portion 70 may also be a mirror image of each other and the middle portion of the center air chute side surface 72 may be narrower than the ends 74,76 of the center air chute side surface 72.

The ATV may have an air chute that extends between front portion of the ATV and rear portion of the ATV. For example, the center air chute 52 may extend from a radiator grill in front of ATV to an air outlet (e.g., radiator) 60 in rear portion of ATV. The rear outlet 60 may feed air into a radiator, or alternatively, the rear outlet 60 may be a radiator. The air chute 52 may be incorporated into and/or along the ATV frame. For example, the center air chute 52 may extend along a bottom portion of passenger or cargo compartment 100 as shown in FIG. 2. The center air chute 52 may extend up into passenger compartment 100 such that a portion of the center air chute can be used as center counsel in the passenger compartment 100. The front inlet 50 may be located in front of cargo compartment cross member 15. In other cases it may be behind cargo compartment cross member 15.

Figure 3:
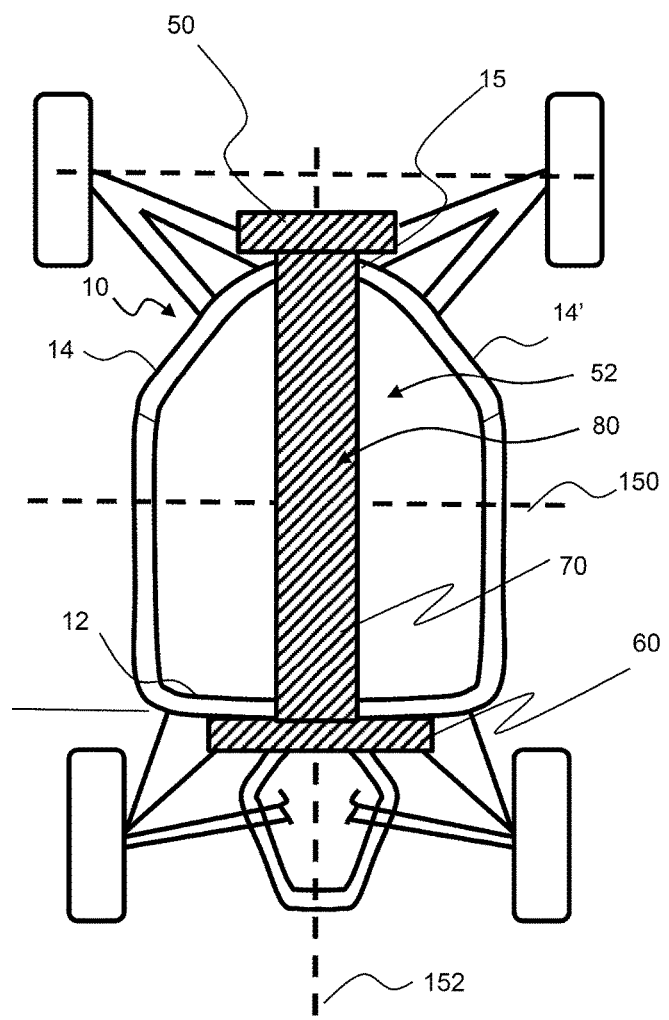
FIG. 3 is a partial plan view of an ATV with an air chute positioned substantially along a longitudinal center line of a vehicle.
Figure 4:
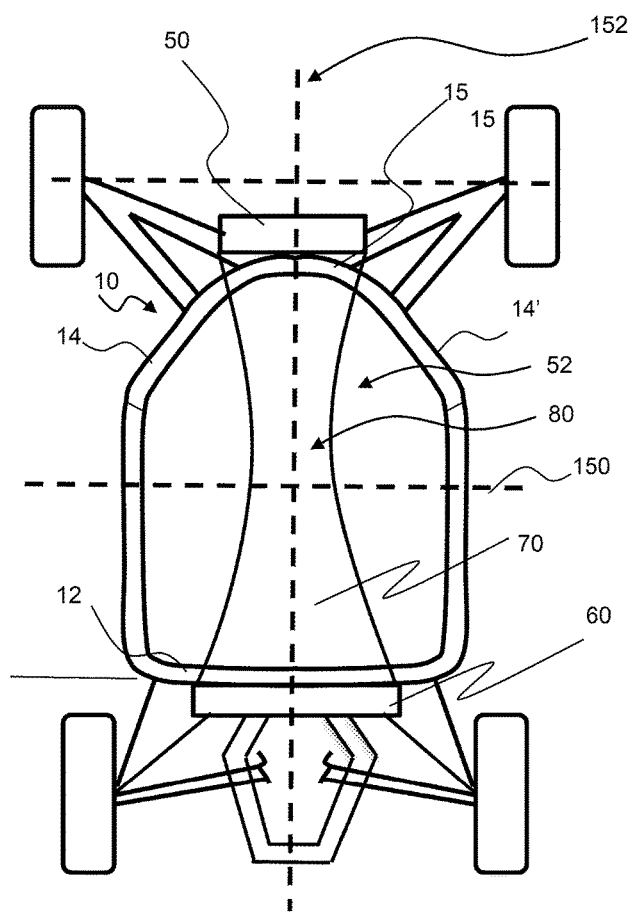
FIG. 4 is a partial plan view of an ATV with an embodiment of a central air chute positioned substantially along a longitudinal center line of a vehicle.

In various embodiments, as shown in FIG. 3, a center air chute 52 is positioned along ATV center line 152. In one example, the center air chute 52 is positioned to be centered along center line 152. Various different positions can be contemplated and considered within scope of this disclosure. The center air chute 52 may have straight edges as shown in FIG. 3. In other embodiments it may be hour glassed shaped, as shown in FIG. 4. The center air chute 52 may be narrower towards middle of center portion 70. For example, it may be narrowest at or near (as shown in FIG. 4) ATV lateral line (e.g., a lateral center line) 150 and be wider on one or more ends. For example, the center portion 70 may be wider where center portion 70 meets front inlet 50 and/or rear outlet 60. Center portion may have a continuous arcuate shape between front inlet 50 and rear outlet 60. The center portion 70 may be configured to give a "venturi-effect".

In various embodiments, a center air chute 52 may be assembled. For example, an ATV in accordance with U.S. Pat. No. 9,493,191, An Arcuate Frame For A Vehicle, Kariniemi as inventor, can be used. A front inlet may be manufactured or purchased. In one embodiment, a front radiator grill with a width of 2 feet 7" and a height of 1 foot 6" can be used. The front radiator grill can be assembled onto ATV like shown in FIG. 3. A center portion 70 of the air chute 52 may be assembled with a width of approximately 12 inches and a height at midpoint of center portion 70 of 1 feet 4 inches and a height at both ends of center portion of 2 feet 3 inches. The center portion 70 may be assembled to a rear outlet with approximate dimensions of 2 feet 10" high by 2 feet 10 inches wide and positioned as shown in FIG. 3. Various sizes, dimensions, and materials or methods of manufacture of the center air chute 52 may be used to accommodate specific needs.

In various embodiments, a center air chute 52 may be used. For example, in an ATV with a rear mounted engine, it can be useful to have more air delivered to the rear mounted engine that can be typically delivered without an air chute. For example, in current ATV's with a rear mounted engine, the engine is limited to air that gets delivered in and around the ATV. In some cases, it is desired to have more air delivered specifically to the engine. A center air chute 52 can deliver additional concentrated air flow to an engine.

It is to be understood that the above reference arrangement are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. A vehicle comprising:
   a cargo compartment;
   a cargo compartment support section having a lateral plane;
   an engine air intake, located forward of the lateral plane of the cargo compartment support section and substantially perpendicular to the ground;
   an air chute comprising a closed bottom portion and the air chute is located rearward of the engine air intake;
   wherein the engine radiator is mounted rearward of the lateral plane of the cargo compartment support section and rearward of the air chute;
   wherein the air chute has a center portion located between the engine air intake and the engine radiator and the center portion has a substantially flat top portion and the substantially flat top portion has a height at its mid portion that is less than the engine air intake height and the engine radiator height and the substantially flat top portion extends up into the passenger compartment; and
   wherein said center portion of the air chute is positioned along a longitudinal center line of the cargo compartment support section and is positioned to be used as a center console in the cargo compartment.

2. The vehicle of claim 1 wherein the air chute closed bottom portion is substantially positioned above a line connecting the front wheel axis and the rear wheel axis.

3. The vehicle of claim 1 wherein the air chute has a funneled portion with a narrowed section at or near the lateral plane of the compartment support section.

4. The vehicle of claim 3 wherein the air chute has a wider portion on both sides of the funneled portion.

5. The vehicle of claim 1 wherein the engine air intake has a width and a height and the width is greater than the height.

6. The vehicle of claim 1 wherein the air chute along the cargo compartment support section has a width and a height and the width is less than the height.

7. The vehicle of claim 1 wherein the air intake has a cross sectional area and the air chute has a smaller cross sectional area.

8. The vehicle of claim 1 further comprising a front wheel axis and a rear wheel axis.

9. The vehicle of claim 1 wherein the air chute has a single continuous arcuate shape from the engine air intake to the engine radiator.

* * * * *